(12) United States Patent  
Gelling et al.

(10) Patent No.: US 8,907,901 B2  
(45) Date of Patent: Dec. 9, 2014

(54) MOTION SENSOR DATA PROCESSING AND INTERFACE AND METHOD THEREOF

(75) Inventors: Richard R. Gelling, Rowlett, TX (US); George C. Smith, Grapevine, TX (US); Michael B. Sheehan, Prosper, TX (US)

(73) Assignee: AMX LLC, Richardson, TX (US)

( * ) Notice: Subject to any disclaimer, the term of this patent is extended or adjusted under 35 U.S.C. 154(b) by 842 days.

(21) Appl. No.: 12/537,570

(22) Filed: Aug. 7, 2009

(65) Prior Publication Data

US 2010/0053102 A1 Mar. 4, 2010

Related U.S. Application Data

(60) Provisional application No. 61/087,048, filed on Aug. 7, 2008.

(51) Int. Cl.
*G06F 3/041* (2006.01)
*G06F 3/0488* (2013.01)

(52) U.S. Cl.
CPC .................................. *G06F 3/04883* (2013.01)
USPC ........................................... 345/173; 715/833

(58) Field of Classification Search
USPC ...................... 345/156–159, 173–179, 35–40
See application file for complete search history.

(56) References Cited

U.S. PATENT DOCUMENTS

| | | | | |
|---|---|---|---|---|
| 4,647,902 | A | * | 3/1987 | Teshima et al. ............... 340/439 |
| 5,369,416 | A | * | 11/1994 | Haverty et al. ................. 345/39 |
| 5,594,469 | A | * | 1/1997 | Freeman et al. .............. 345/158 |
| 6,674,416 | B2 | * | 1/2004 | Kamei et al. ................... 345/39 |
| 7,394,451 | B1 | * | 7/2008 | Patten et al. ............. 361/679.41 |
| 7,421,727 | B2 | * | 9/2008 | Oya et al. ...................... 725/105 |
| 7,763,842 | B2 | * | 7/2010 | Hsu et al. ...................... 250/221 |

* cited by examiner

*Primary Examiner* — Robin Mishler

(57) ABSTRACT

A motion sensor comprises a touch screen, and a motion indictor proximate to the touch screen, the touch screen displaying: an adjusting bar indicating a threshold at which motion is detected, and a level bar indicating an amount of currently measured motion.

16 Claims, 3 Drawing Sheets

MOTION SENSOR DATA PROCESSING AND INTERFACE AND METHOD THEREOF

CROSS-REFERENCE TO RELATED APPLICATION

The present invention is related to and claims priority from provisional patent application No. 61/087,048, filed on Aug. 07, 2008, the entire contents of which are incorporated by reference herein.

FIELD OF THE INVENTION

Apparatus and methods consistent with the present invention relate to motion detection. More particularly, the present invention relates to a motion sensor and method thereof that senses motion across the front of the sensor, and wherein data from the motion sensor is processed using statistical methods.

BACKGROUND OF THE INVENTION

Motion is typically detected by measuring a change in speed or vector of an object in a field of view. Motion detectors as in the present invention detect motion by quantifying and measuring changes in a given environment through, for example, optical detection and/or acoustical detection. However, problems exist in motion sensors in determining whether a motion sensor is in operation, and in detecting different levels of motion.

SUMMARY OF THE INVENTION

The present invention addresses these and other problems by allowing a user to easily determine if a motion sensor is operational by observing a level indicator while "moving" in front of a panel of the motion sensor.

Further, a motion threshold setting may be set and adjusted to detect different levels of motion as well as being able to turn motion detection "on or off".

In one embodiment, a motion sensor comprises a touch screen, and a motion indictor proximate to the touch screen, the touch screen displaying: an adjusting bar indicating a threshold at which motion is detected, and a level bar indicating an amount of currently measured motion.

In another embodiment, a method for sensing motion comprises selecting an adjusting bar on a touch screen indicating a threshold at which motion is detected, moving the selected adjusting bar up or down, measuring motion by a level bar proximate the adjusting bar, acquiring the measured motion, calculating a mean and a variance, and comparing the calculated mean and variance to the threshold at which motion is detected, wherein a variance above the threshold is declared as motion, whereas a variance below the threshold is considered noise.

DETAILED DESCRIPTION OF THE INVENTION

Figure 1A:
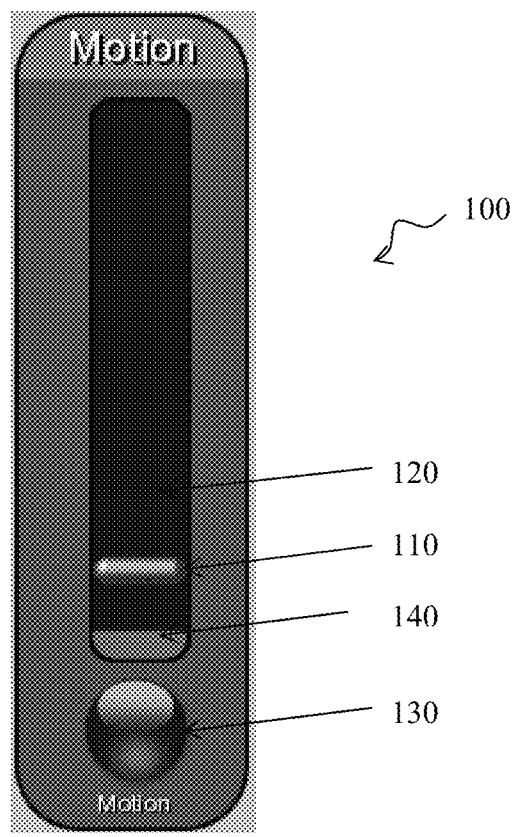
FIG. 1A depicts an exemplary embodiment of the invention including a motion sensor indicating a motion below a desired threshold.
Figure 1B:
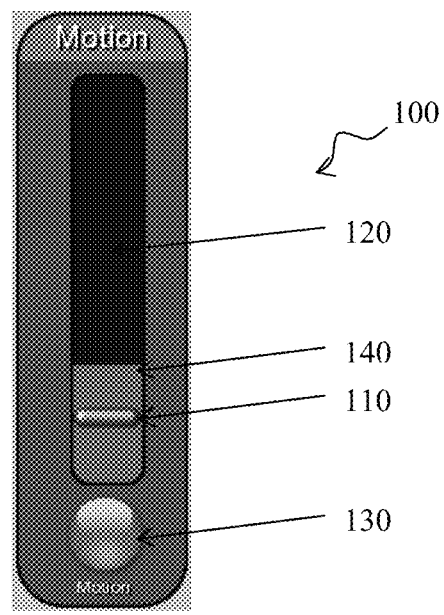
FIG. 1B depicts the motion sensor of FIG. 1A indicating a motion above the desired threshold.

FIGS. 1A and 1B depict a motion sensor 100 of the present invention that is structured to sense lateral motion across the front of the motion sensor 100. The motion sensor 100 may be an independent element that can be affixed to a wall or other structure or may be integrated in another fixed element (such as a touch pad or other wall mounting) or to a mobile element (such as a touch pad, remote control, cellular phone, or other wireless apparatus). In FIGS. 1A and 1B, the use of the same reference numbers indicates similar or identical items.

In the invention, data from the motion sensor 100 may be processed using statistical methods. For example, a statistical mean may be calculated using 10 samples from the sensor. At 1 sample every 100 milliseconds, this represents 1 second in time. A variance may then be calculated to and/or from the mean to determine the "spread" of the data. As each new sample is acquired from the sensor, a new mean and variance may be calculated and compared to a motion threshold. A variance above the threshold may be declared as motion, whereas a variance below the threshold may be considered noise.

In an exemplary embodiment of the invention, a user may have control over the threshold and can adjust the threshold to values between 0 and 100. The threshold limits (0 to 100) are relative values used to represent the standard deviation (STD) of the sensor data. The STD is also the value presented as the current level of motion. Therefore, the user may accurately set the motion threshold using the current level as a reference, as shown in the drawings of the invention. Of course, the threshold level may be set by electronic means, or embodied as a computer-readable medium including instructions for setting the motion threshold.

Further, firmware may convert between variance and STD as needed, wherein variance may be used by the firmware to determine motion detection and STD may be used for displaying motion level and threshold to the user.

In another exemplary embodiment, the sensitivity of the threshold and motion level displayed to the user may be determined empirically and set to enable the user to observe full scale level deflection when an infrared (IR) source the size (and temperature) of a human hand is passed in front of the sensor at a distance of 1 foot.

In FIGS. 1A and 1B, adjusting bar 110 represents a "threshold." Adjusting bar 110's position is adjustable by the user via the panel's touch screen 120. To adjust the threshold, the user may select (touch) the adjusting bar 110 and move it up or down while maintaining pressure on the touch screen 120.

The adjusting bar 110 may also indicate the level at which the software will declare motion being detected. This event is represented by the "Motion" indicator 130, for example, changing colors. Further, the level bar 140 may indicate the amount of motion currently measured by the motion sensor. As shown in comparison of FIGS. 1A and 1B, the level bar 140 in FIG. 1B is above the adjusting bar 110, indicating motion.

The present invention provides a motion sensor that is easy to use. There is no "guess work" in setting the threshold level. Further, a user may visually see the level of motion of the environment and set the threshold with respect to that level feedback. The threshold adjustment is on the same scale and the level feedback.

Also, the threshold setting is adjustable, not just on or off. As such, a user can "see" the motion and positively verify the motion sensor is operational.

In another exemplary embodiment of the invention, a test button may be included with the sensor. The test button may light up, for example, to indicate that a motion has been detected. The Test button may be used to put the panel in a real time mode (i.e., asleep) so it would wake up when motion trigger occurs as it would in a real environment.

Figure 2:
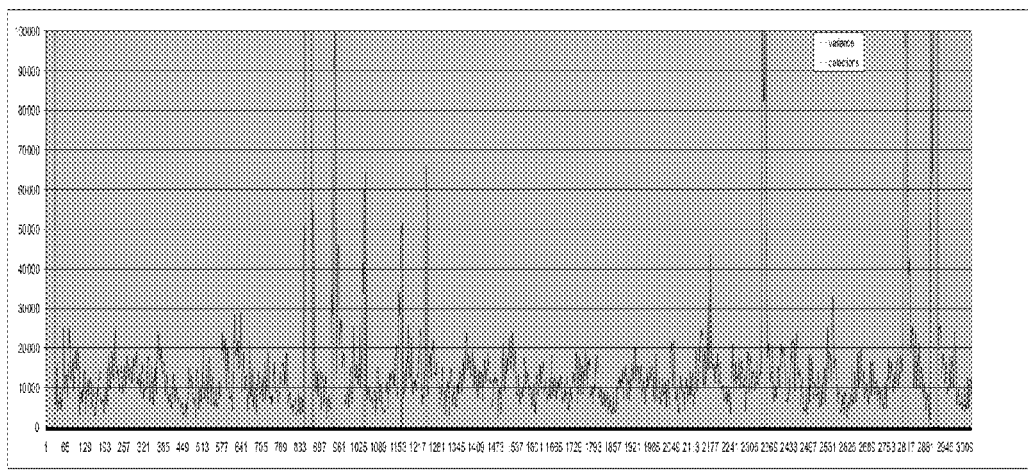
FIG. 2. is a graph depicting statistical analysis results of data from a motion sensor in accordance with an exemplary method of the invention.

FIG. 2. is a graph depicting statistical analysis results of data from a motion sensor in accordance with an exemplary method of the invention.

Although the foregoing invention has been described in some detail by way of illustration and example for purposes of clarity and understanding, those of ordinary skill in the art will recognize that in light of the teachings herein, certain changes and modifications may be made thereto without departing from the spirit or scope of the invention.

What is claimed is:

1. A motion sensor, comprising:
   a touch screen; and
   a motion indictor proximate to the touch screen, wherein the touch screen is configured to simultaneously display:
      an adjusting bar indicating a threshold at which motion is detected, and
      a level bar indicating an amount of currently measured motion, and
      the adjusting bar and the level bar are configured to overlap one another.

2. The motion sensor of claim 1, wherein a position of the adjusting bar is adjustable.

3. The motion sensor of claim 2, wherein the position is adjusted by a selection of the adjusting bar and a movement of the adjusting bar up or down.

4. The motion sensor of claim 1, wherein the motion indicator changes color when the adjusting bar indicates detected motion.

5. The motion sensor of claim 1, wherein the motion sensor is an independent element that can be affixed to a wall or other structure.

6. The motion sensor of claim 1, wherein the motion sensor is integrated in a fixed element.

7. The motion sensor of claim 1, wherein the motion sensor is integrated in a mobile element.

8. The motion sensor of claim 1, wherein data from the motion sensor is processed by a calculated statistical mean using a number of samples from the sensor over a time period.

9. The motion sensor of claim 8, wherein a variance is calculated to and/or from the mean to determine a "spread" of the data.

10. The motion sensor of claim 9, wherein as each new sample is acquired from the sensor, a new mean and variance are calculated and compared to the threshold at which motion is detected.

11. The motion sensor of claim 10, wherein a variance above the threshold is considered to be motion, whereas a variance below the threshold is considered to noise.

12. A method for sensing motion, comprising:
   selecting an adjusting bar on a touch screen indicating a threshold at which motion is detected;
   moving the selected adjusting bar up or down;
   measuring motion by a level bar proximate the adjusting bar;
   acquiring the measured motion;
   calculating a mean and a variance; and
   comparing the calculated mean and variance to the threshold at which motion is detected, wherein
   a variance above the threshold is declared as motion, whereas a variance below the threshold is considered noise, and
   the adjusting bar and the level bar are configured to be simultaneously displayed and overlap one another.

13. The motion sensor of claim 1, wherein the motion sensor is configured to set a sensitivity of the threshold of the adjusting bar and a motion level of the level bar that are displayed to a user based on an empirical determination.

14. The method of claim 12, further comprising:
   setting a sensitivity of the threshold of the adjusting bar and a motion level of the level bar that are displayed to a user based on an empirical determination.

15. The motion sensor of claim 13, wherein the motion sensor is configured to detect when the user's hand passes at a distance of one foot from the motion sensor, but does not contact the motion sensor.

16. The method of claim 14, further comprising detecting when the user's hand passes at a distance of one foot from a motion sensor, but does not contact the motion sensor.

* * * * *